Dec. 9, 1930.  J. R. MORRIS  1,784,244
ADJUSTABLE PIPE SUSPENDER
Filed Sept. 22, 1928
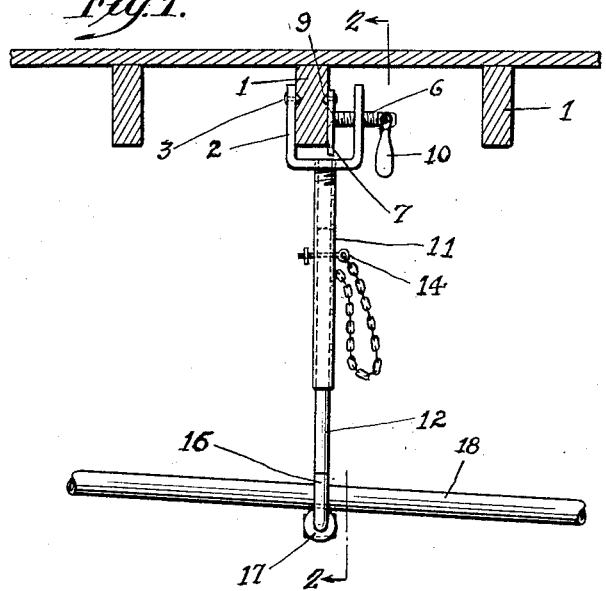
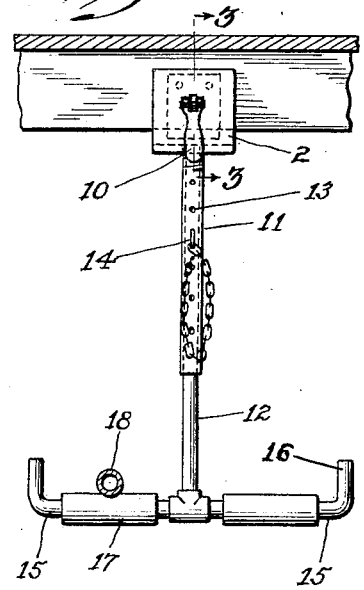
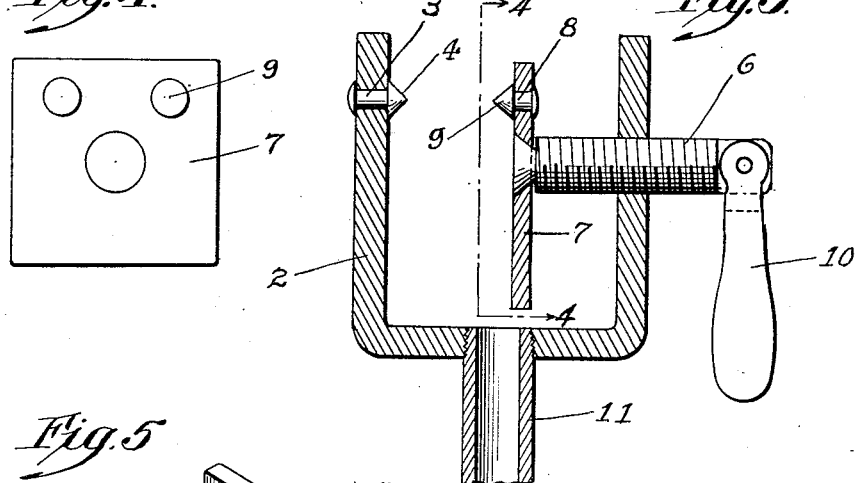
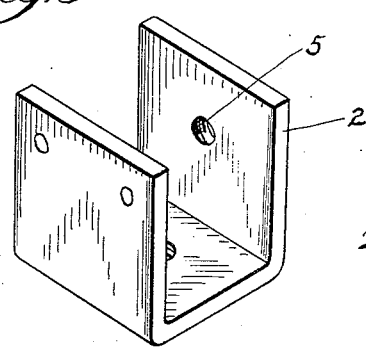
Inventor
John R. Morris.
by Watson E. Coleman.
Attorney Patented Dec. 9, 1930

1,784,244

UNITED STATES PATENT OFFICE

JOHN R. MORRIS, OF PHILADELPHIA, PENNSYLVANIA

ADJUSTABLE PIPE SUSPENDER

Application filed September 22, 1928. Serial No. 307,610.

This invention relates to an adjustable supporting device designed primarily for supporting overhead pipes.

The primary object of the present invention is to provide an overhead pipe supporting device which may be readily secured to a suitable supporting element such as an overhead floor joist and which may be vertically adjusted either before or after attaching to the supporting structure to position a pipe carried thereby at the proper height and inclination.

The invention broadly contemplates the provision of a clamp having a depending telescoping arm attached at one end thereto, the other end of the arm structure carrying one or more lateral arms over and upon which a pipe or a number of pipes may pass and rest.

A further object of the present invention is to provide a pipe support of simple design, strong and durable construction and of such character that it may be quickly placed in or removed from position.

The invention will be best understood from a consideration of the following detailed description taken in connection with the accompanying drawings forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the pipe suspender embodying the present invention;

Figure 2 is a front elevational view of the structure;

Figure 3 is a sectional view taken upon the line 3—3 of Figure 2;

Figure 4 is a face view of the shiftable clamping plate of the structure;

Figure 5 is a detail perspective view of the clamp yoke.

Referring to the drawing in detail, the numerals 1 indicate floor joists of a building structure to which the present device may be attached for the suspension of pipes of the building plumbing system.

The pipe suspender comprises a substantionally broad U-shaped clamp yoke 2, one side plate of which is provided with a plurality of rivets 3 having their inner ends pointed to provide spurs 4. The opposite side plate of the clamping yoke has a centrally threaded aperture 5 formed therethrough designed to receive a screw 6, upon the inner end of which screw is swivelly mounted a shiftable clamp plate 7 which carries a series of pins 8 each having its inner end pointed to form the spur 9, the spurs of these pins 8 being arranged in opposed relation to the spurs 4 of the pins 3. The outer end of the screw 6 has pivotally atached thereto a handle 10 designed to facilitate the rotation of the screw to move the shiftable clamping plate 7 toward or away from the opposed yoke plate.

Detachably secured to the intermediate portion of the clamp yoke 2, is a tubular arm 11 into the lower end of which an associate shiftable arm 12 slidably extends, the arms 11 and 12 each being provided with a series of apertures 13 which are designed to be brought into alinement when the arms are adjusted to the proper position to receive a retaining bolt 14. The lower end of the shiftable arm carries a pair of laterally extending arms 15, the outer end of which is turned upwardly as indicated at 16. Arms 15 are provided with rotatable sleeves 17 so that when a pipe is laid thereacross as indicated at 18 it may be readily shifted back and forth without frictionally contacting with the supporting arm.

From the foregoing description, it will be readily seen that the pipe support herein described may be advantageously employed during the operation of cutting or threading a pipe length to support the end of the pipe length remote from that end which is secured in a clamp or vice. While the device is designed primarily for use while cutting or otherwise preparing pipe sections for use, it is, of course, obvious that a number of these devices may be employed for permanently supporting pipe lines in building structures.

Having thus described my invention, what I claim is:—

1. A pipe suspender comprising a substantially U-shaped body member, said body having a threaded opening in one side and in the bottom thereof, a plurality of inwardly extending beam piercing members in the opposite side of said body, a threaded shaft engaging said threaded opening in said body, a plate pivotally mounted on the inner end of said shaft, a plurality of beam piercing members mounted on said plate and opposing the piercing members of said body, a handle pivotally secured to the outer end of said shaft, an adjustable arm depending from said body, a lateral arm carried by said depending arm and rollers on said lateral arm.

2. A pipe suspender comprising a substantially U-shaped body member having a threaded opening at one side and the bottom thereof, a plurality of pins mounted in one side of the body member and extending inwardly thereof, a threaded opening in the side of the body, a plate pivotally mounted on the inner end of said shaft, a plurality of beam piercing members mounted on said plate and opposing the pins on said body, a handle pivotally secured to the outer end of said shaft, a depending arm mounted in the threaded opening of said body, said depending arm comprising an upper and a lower tubular member, said lower tubular member being adapted to telescope into said upper member, a plurality of openings in said tubular members, locking means engaging said openings of said tubular member, a lateral arm carried by the lower of said tubular members, said lateral arm having upwardly extending outer end portions and rollers mounted on said lateral arm.

In testimony whereof I hereunto affix my signature.

JOHN R. MORRIS.